United States Patent
Wu et al.

(10) Patent No.: US 9,822,924 B2
(45) Date of Patent: Nov. 21, 2017

(54) ROTATION TYPE SLIDING BAR WITH QUICK ASSEMBLY AND DISASSEMBLY

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Yulin Wu, Fujian (CN); Wenxing Chen, Fujian (CN); Yong Gao, Fujian (CN); Huasong Zhou, Fujian (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 90 days.

(21) Appl. No.: 14/843,498

(22) Filed: Sep. 2, 2015

(65) Prior Publication Data

US 2017/0082239 A1 Mar. 23, 2017

(51) Int. Cl.
*A47H 1/14* (2006.01)
*F16M 13/02* (2006.01)
*A47H 1/00* (2006.01)
*A47K 10/10* (2006.01)

(52) U.S. Cl.
CPC ............... *F16M 13/02* (2013.01); *A47H 1/14* (2013.01); *A47H 2001/003* (2013.01); *A47K 10/10* (2013.01)

(58) Field of Classification Search
CPC .. A47K 10/10; A47K 2001/003; A47K 10/04; A47K 1/02; A47H 1/14; A47H 1/10; H01R 13/625; F16M 13/02

USPC .. 248/251, 257, 222.52, 223.31, 224.7, 258, 248/265, 222.13, 259; 211/88.04, 265, 211/87.01, 105.1, 123–124, 7, 16; 403/361, 374.1; 4/570, 605
See application file for complete search history.

(56) References Cited

U.S. PATENT DOCUMENTS

| | | | | |
|---|---|---|---|---|
| 2,896,899 | A * | 7/1959 | Ronan | A47H 1/102 248/251 |
| 6,068,223 | A * | 5/2000 | Navarro | F16M 11/14 224/265 |
| 6,453,486 | B1 * | 9/2002 | Chen | E03C 1/06 239/283 |
| 6,896,228 | B1 * | 5/2005 | Lu | A47K 3/003 211/105.1 |

(Continued)

FOREIGN PATENT DOCUMENTS

CN 202355298 8/2012

*Primary Examiner* — Christopher E Garft
(74) *Attorney, Agent, or Firm* — Rabin & Berdo, P.C.

(57) ABSTRACT

A rotation type sliding bar with quick assembly and disassembly, includes a bar and a wall bracket device that can be fixedly assembled to the wall, a lock set and a rotation sleeve. The lock set is disposed with a sleeve portion coupled to and sleeved on the outer side of the wall bracket, the sleeve portion is disposed with at least an assembly hole vertically running through the sleeve portion; the bar is inserted to the assembly hole, the rotation sleeve is sleeved on the sleeve portion, the rotation sleeve is coupled to the wall bracket, the wall bracket, the lock set and the rotation sleeve are locked and the sleeve portion is driven to slide with respect to the wall bracket by moving the rotation sleeve, so that the wall bracket pushes the bar to lock and connect the wall bracket, the lock set and the bar.

9 Claims, 11 Drawing Sheets

(56) References Cited

U.S. PATENT DOCUMENTS

| | | | | |
|---|---|---|---|---|
| 6,942,190 B1* | 9/2005 | Lu | ............... | F16B 47/00 |
| | | | | 248/205.5 |
| 7,197,776 B2* | 4/2007 | Tsai | ............... | E03C 1/066 |
| | | | | 248/230.1 |
| 7,367,535 B2* | 5/2008 | Lai | ............... | A47K 10/10 |
| | | | | 211/105.1 |
| 8,671,545 B1* | 3/2014 | Zimmerman | ............... | F16M 13/02 |
| | | | | 211/123 |
| 9,550,195 B1* | 1/2017 | Cao | ............... | B05B 1/185 |
| 2005/0263655 A1* | 12/2005 | Bauer | ............... | A47K 10/10 |
| | | | | 248/223.31 |
| 2011/0179566 A1* | 7/2011 | Yang | ............... | E03C 1/066 |
| | | | | 4/605 |
| 2012/0123896 A1* | 5/2012 | Prodanovic | ............... | A47H 1/102 |
| | | | | 705/26.5 |
| 2012/0145854 A1* | 6/2012 | Smith | ............... | A47K 10/10 |
| | | | | 248/226.11 |
| 2013/0248017 A1* | 9/2013 | Neagoe | ............... | E03C 1/0408 |
| | | | | 137/359 |
| 2014/0124598 A1* | 5/2014 | Vaccaro | ............... | E03C 1/06 |
| | | | | 239/289 |
| 2015/0008202 A1* | 1/2015 | Schuetz | ............... | A47F 5/0876 |
| | | | | 211/87.01 |
| 2015/0096117 A1* | 4/2015 | Forrest | ............... | A47H 1/022 |
| | | | | 4/610 |
| 2017/0082239 A1* | 3/2017 | Wu | ............... | F16M 13/02 |

\* cited by examiner

ROTATION TYPE SLIDING BAR WITH QUICK ASSEMBLY AND DISASSEMBLY

FIELD OF THE INVENTION

The present invention relates to a rotation type sliding bar with quick assembly and disassembly.

BACKGROUND OF THE INVENTION

A sliding bar device is disclosed in the Chinese patent database with announcement number CN202355298U in Aug. 1, 2012, the sliding bar device comprises a sliding bar and a plurality of connecting mechanisms that are arranged spaced along the sliding bar; each connecting mechanism comprises a ball set assembled to the sliding bar, a fixation portion assembled to the wall and a lock portion. The ball set is disposed with a ball; the fixation portion is disposed with external thread, the lock portion is disposed with internal thread, the external thread and the internal thread are connected to make the fixation portion and the lock portion form a cavity, the cavity and the ball form an universal connecting. The assembly method is that: the lock portion is sleeved on the transverse bar of the ball set; the fixation sleeve is sleeved on the sliding bar, the lock screw is rotated to connect the ball set and the sliding bar; the fixation set is fixedly connected to the wall; the internal thread of the fixation nut is threaded to the external thread of the fixation set, so that the ball pad ring and the bushing form the cavity, the cavity and the ball form a universal connecting, and the ball is positioned in the cavity. Therein: the bushing is supported on the ball surface of the ball corresponding to the sliding bar; the ball pad ring is supported on the ball surface of the ball that is opposite to the sliding bar. It is complicated to assemble that it needs improvement.

SUMMARY OF THE INVENTION

The present invention is provided with a rotation type sliding bar with quick assembly and disassembly, which overcomes the disadvantages of the existing known technology.

The technical proposal of the present invention is that:

A rotation type sliding bar with quick assembly and disassembly, comprising a bar (1) and a wall bracket device, wherein the wall bracket device comprises a wall bracket (2) that can be fixedly assembled to the wall, a lock set (3) and a rotation sleeve (4); the lock set (3) is disposed with a sleeve portion (31) coupled to and slidably sleeved on the outer side of the wall bracket (2), the sleeve portion (31) is disposed with at least an assembly hole (32) vertically running through the sleeve portion (31); the bar (1) is inserted to the assembly hole (32), the rotation sleeve (4) is sleeved on the sleeve portion (31), the rotation sleeve (4) is coupled to the wall bracket (2), the wall bracket (2), the lock set (3) and the rotation sleeve (4) are locked and the sleeve portion (31) is driven to slide with respect to the wall bracket (2) by moving the rotation sleeve (4), so that the wall bracket (2) pushes the bar (1) to lock and connect the wall bracket (2), the lock set (3) and the bar (1).

In another preferred embodiment, the wall bracket (2) is disposed with a step surface (21) surrounding the end and facing the end; the end face of the sleeve portion (31) is concaved with at least two grooves (33), a suspending arm (34) is formed between two adjacent grooves (33), the end of the suspending arm (34) is protruding inwardly to form a lock catch (35); a coupling boss (41) is fixedly disposed in the rotation sleeve (4); the rotation sleeve (4) can be sleeved on the sleeve portion (31) and the coupling boss (41) abuts against the end of the suspending arm (34), so that the suspending arm (34) can be elastic deformed to make the lock catch (35) abut against the step surface (21) or the suspending arm (34) is elastic deformed and repositioned, the lock catch (35) pushes the step surface (21) and the wall bracket (2) pushes the bar (1) to lock and connect the wall bracket (2), the lock set (3) and the bar (1) together.

In another preferred embodiment, the rotation sleeve (4) can be sleeved on the sleeve portion (31), the coupling boss (41) is disposed with a guiding surface (42) along the rotation direction of the rotation sleeve (4), the semi-diameter of the guiding surface (42) is gradually changing, the guiding surface (42) abuts against the end of the suspending arm (34), with the gradually changing semi-diameter of the guiding surface (42), the suspending arm (34) can be elastic deformed.

In another preferred embodiment, the coupling boss (41) is further disposed with a holding surface (43) connected to the smallest inner diameter side of the guiding surface (42), the inner side surface of the holding surface (43) is an arc surface and the diameter thereof is equal to the smallest inner diameter of the guiding surface (42).

In another preferred embodiment, the rotation sleeve (4) can be sleeved on the sleeve portion (31) and move forth and back in the axial direction of the sleeve portion (31); the coupling boss (41) is disposed with a guiding surface (42) along the moving direction of the rotation sleeve (4), the semi-diameter of the guiding surface (42) is gradually changing, the guiding surface (42) abuts against the end of the suspending arm (34), with the gradually changing semi-diameter of the guiding surface (42), the suspending arm (34) can be elastic deformed.

In another preferred embodiment, the rotation sleeve (4) can be sleeved on the sleeve portion (31); the coupling boss (41) and the suspending arm (34) are respectively disposed with coupling thread, with the biting force of the threads, the suspending arm (34) can be elastic deformed.

In another preferred embodiment, the wall bracket (2) is disposed with an accommodating cavity (29) surrounding the front end of the wall bracket (2) and facing the rear end of the wall bracket (2), the accommodating cavity (29) is disposed with a plurality of ribs; the end face of the sleeve portion (31) is concaved with at least two grooves (33), a suspending arm (34) is formed between two adjacent grooves (33), the end of the suspending arm (34) is protruding inwardly to form a lock catch (35); a coupling boss (41) is fixedly disposed in the rotation sleeve (4); the sleeve portion (31) can be sleeved on the wall bracket, so that the rib abuts against the end of the suspending arm; with the push force, the suspending arm can be elastic deformed to make the lock catch (35) abut against the coupling boss (41). In another preferred embodiment, the end of the suspending arm (34) is raised in its natural state.

In another preferred embodiment, the rotation sleeve (4) is disposed with an outer sleeve (44), the coupling boss (41) is disposed in the outer sleeve (44) and is fixedly connected by a spoke (45), the upper periphery of the outer sleeve (44) is extending inwardly to form an annular plate (46), the coupling boss (41) is fixedly connected to the inner periphery of the annular plate (46).

In another preferred embodiment, the wall bracket (2) comprises a step portion, the step portion is disposed with a big section (24), a small section (25) and a stage surface (26) between the big section (24) and the small section (25); the sleeve portion (31) is sleeved on the small section (25) in sliding way, the big section (24) and the rotation sleeve (4) form a detachable connection mechanism.

In another preferred embodiment, the outer periphery of the end of the sleeve portion (31) corresponding to the wall bracket (2) is extending outwardly to form a first protruding ring (38); the inner periphery of one end of the rotation sleeve (4) extending inwardly to form a second protruding ring (47); the inner diameter of the second protruding ring (47) is coupled to the outer diameter of the sleeve portion (31), the outer diameter of the big section (24) is larger than the inner diameter of the second protruding ring (47), the big section (24) and the rotation sleeve (4) are assembled together to make the second protruding ring (47), the first protruding ring (38) and the stage surface (26) contacted tightly.

In another preferred embodiment, the rotation sleeve (4) is connected at the outer side of the lock set (3).

In another preferred embodiment, the sleeve portion (31) is disposed with a friction pad (5) at the inner side, the friction pad (5) abuts against between the wall bracket (2) and the bar (1).

In another preferred embodiment, it further comprises a decoration cover (6), the decoration cover (6) is disposed with a throughout hole (61) running throughout vertically, the decoration cover (6) is sleeved on the lock set (3), the throughout hole (61) is aligned with the assembly hole (32) in coupling way.

Comparing to the existing technology, the technical proposal of the present invention has advantages as follows:

The rotation sleeve moves to lock the wall bracket, the lock set and the rotation sleeve, it can drive the sleeve portion to slide with respect to the wall bracket, so that the wall bracket pushes the bar to lock the wall bracket, the lock set and the bar, it overcomes the disadvantages of the existing known technology, and it has following well effects: a. once operation can lock the wall bracket, the lock set and the bar together and release the lock, it needs less components, the operation is simplified; b. the assembly distance of the wall bracket is adjustable, it is available to the wall that has the screw holes with different distance, so that it doesn't need to reposition the hole, the wall brackets can be assembled in any direction; c. the assembly process is quick and fast, so as the disassembly process, rotating the rotation sleeve can assemble and disassemble the bar, it has high reliability and convenient operation.

BRIEF DESCRIPTION OF THE DRAWINGS

The present invention will be further described with the drawings and the embodiments.

DETAILED DESCRIPTION OF THE EMBODIMENTS

Referring to FIGS. 1-8, a rotation type sliding bar with quick assembly and disassembly comprises a bar 1 and two wall bracket devices, in this embodiment, it takes two wall bracket devices for example, it should be noted that it is not limited, one wall bracket device or three are available in this embodiment. The bar 1 is connected with a slide set 8 in sliding way, the slid set 8 is disposed with a plug base for the a shower head to insert and connect.

The wall bracket device comprises a wall bracket 2 fixedly connected to the wall, a lock set 3, a rotation sleeve 4 and a friction pad 5.

The wall bracket 2 is disposed with a step surface 21 surrounding the end and facing the end, preferred, the step surface is a conical surface. In this embodiment, the outer side surface of the wall bracket 2 is a revolution surface, the outer side line of the revolution surface comprises a first straight section, a second straight section and an incline line, the first straight section is parallel to the second straight section, the incline line connects the first straight section and the second straight section, the intersection angle of the incline line and the first straight section is larger than 90 degrees and smaller than 180 degrees, the incline line rotates the axis to obtain the revolution surface, as needed, it can be only disposed with the first straight section and the incline line, the first straight section is connected to the incline line, the revolution surface section of the incline line is above mentioned step surface 21. As needed, the wall bracket 2 comprises the revolution sleeve corresponding to the revolution surface and a fixation sleeve 22 disposed in the revolution sleeve, the revolution sleeve is fixedly connected to the fixation sleeve 22 by a first spoke 23. A screw 7 runs through the inner hole of the fixation sleeve 22 and then threaded to the screw hole of the wall, so as to fix the wall bracket 2 to the wall.

The lock set 3 is disposed with a sleeve portion 31 coupled to and sleeved on the wall bracket 2, the sleeve portion 31 is disposed with at least an assembly hole 32 vertically running through the sleeve portion 31, the end face of the sleeve portion 31 is concaved with at least two grooves 33, a suspending arm 34 is disposed between two adjacent grooves 33, the end of the suspending arm 34 is protruding inwardly to form a lock catch 35. The suspending arm 34 is elastic and deformable, the end of the suspending arm 34 is raised in its natural state, in the deforming state, the outer side surface of the suspending arm 34 is parallel to the axis of the lock set 3. Vertically running through means the axis of the assembly hole is vertical to the axis of the sleeve portion. Preferred, the end face of the lock catch 35 of the suspending arm 34 facing the assembly hole 32 is a conical surface, the angle of cone of the conical surface is equal to the angle of cone of the step surface 21.

A coupling boss 41 is disposed in the rotation sleeve 4, the coupling boss 41 is disposed with a guiding surface 42, the diameter of the guiding surface 42 is gradually changed, the changing comprises reducing.

Figure 1:
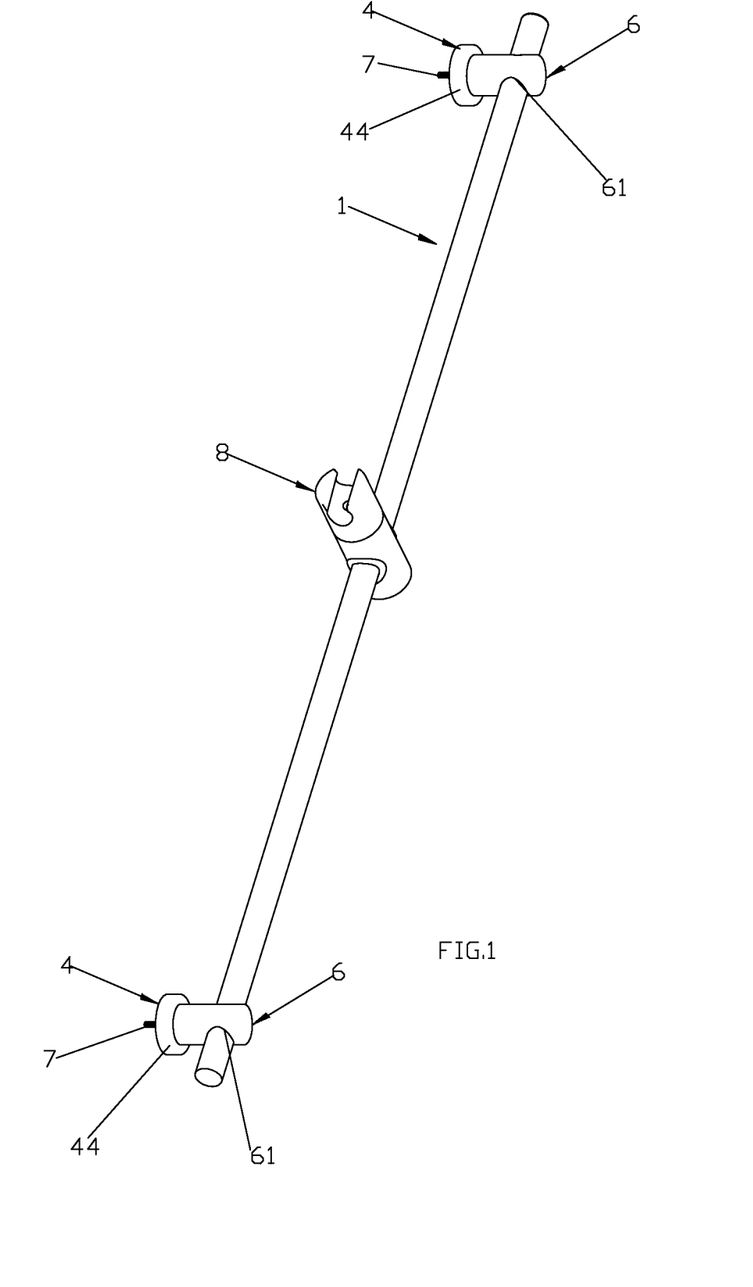
FIG. 1 illustrates a schematic diagram of the sliding bar of a first embodiment.
Figure 2:
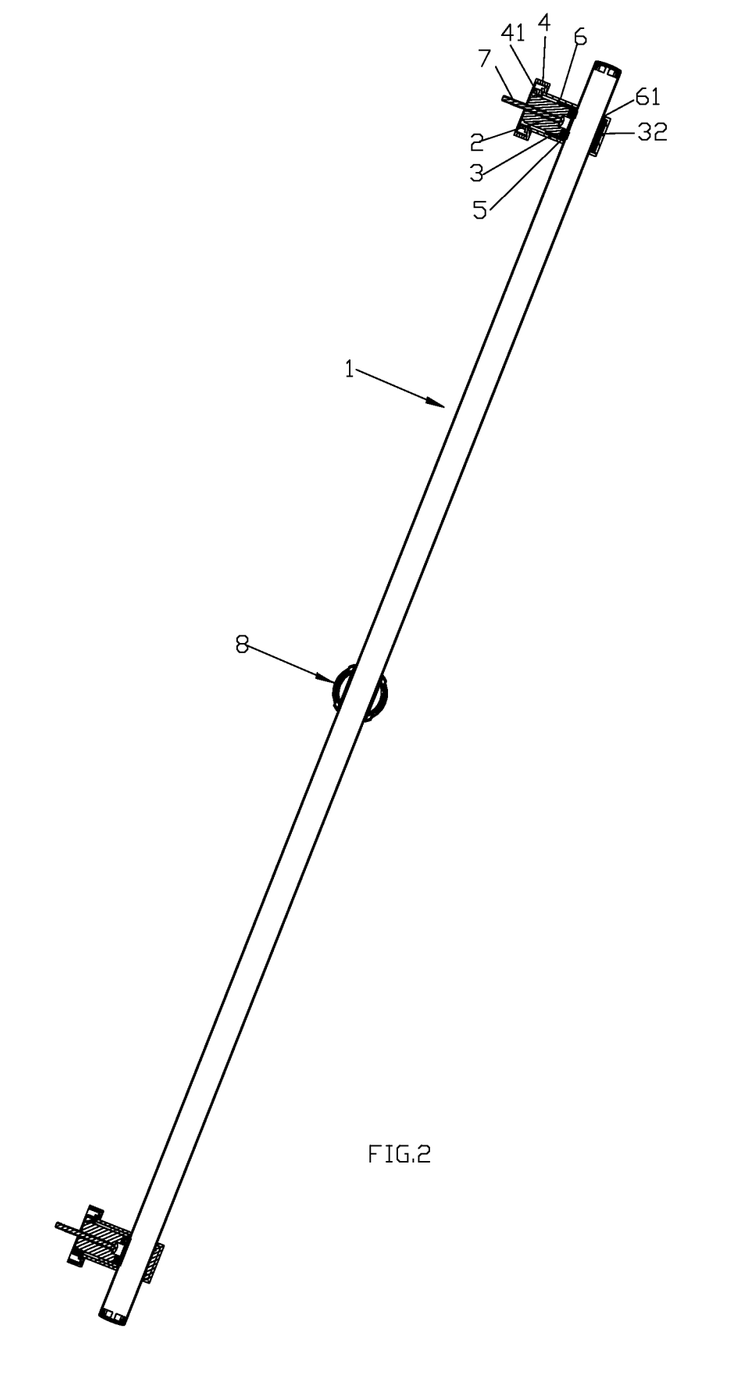
FIG. 2 illustrates a sectional diagram of the sliding bar.
Figure 3:
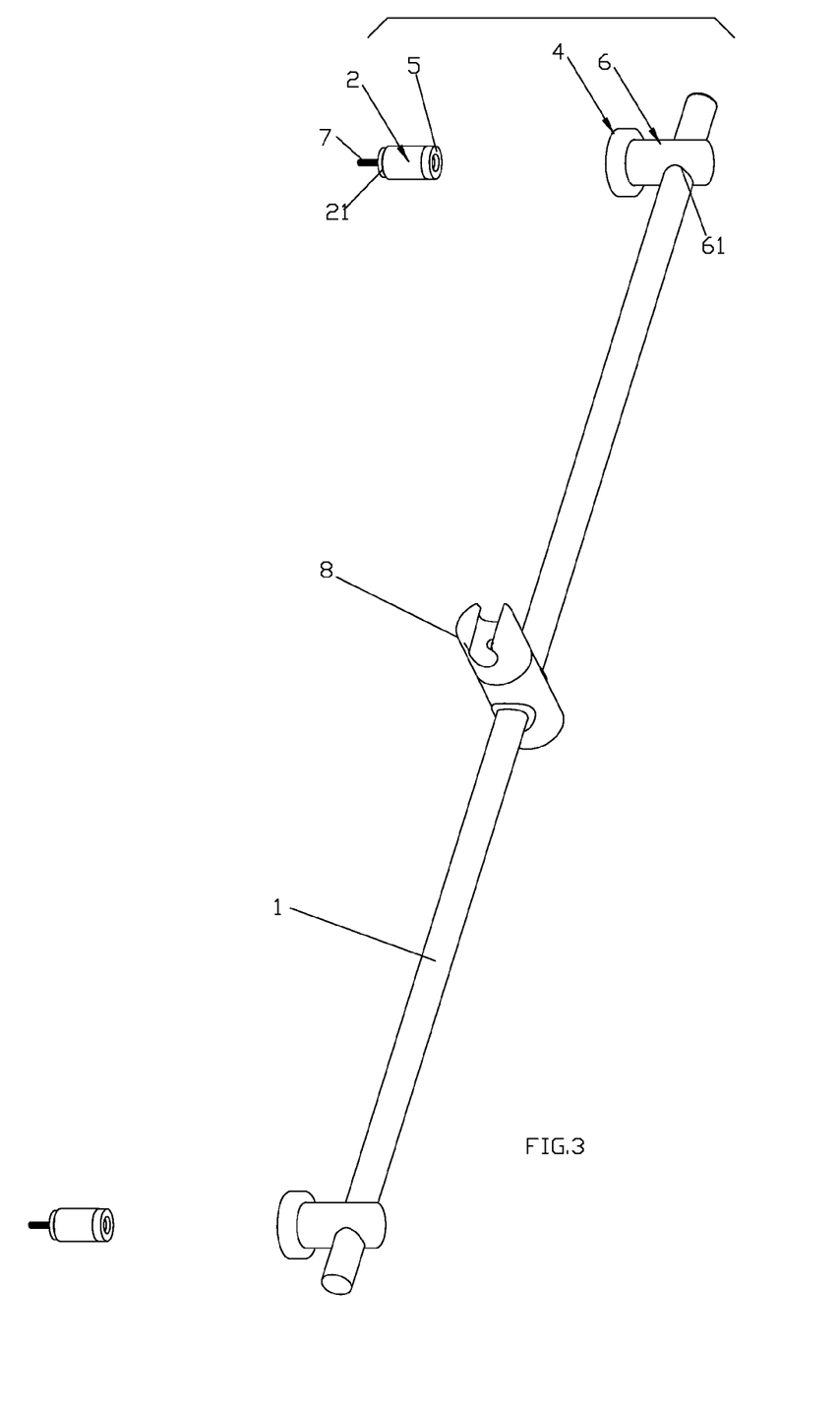
FIG. 3 illustrates an exploded and schematic diagram of the sliding bar.
Figure 4:
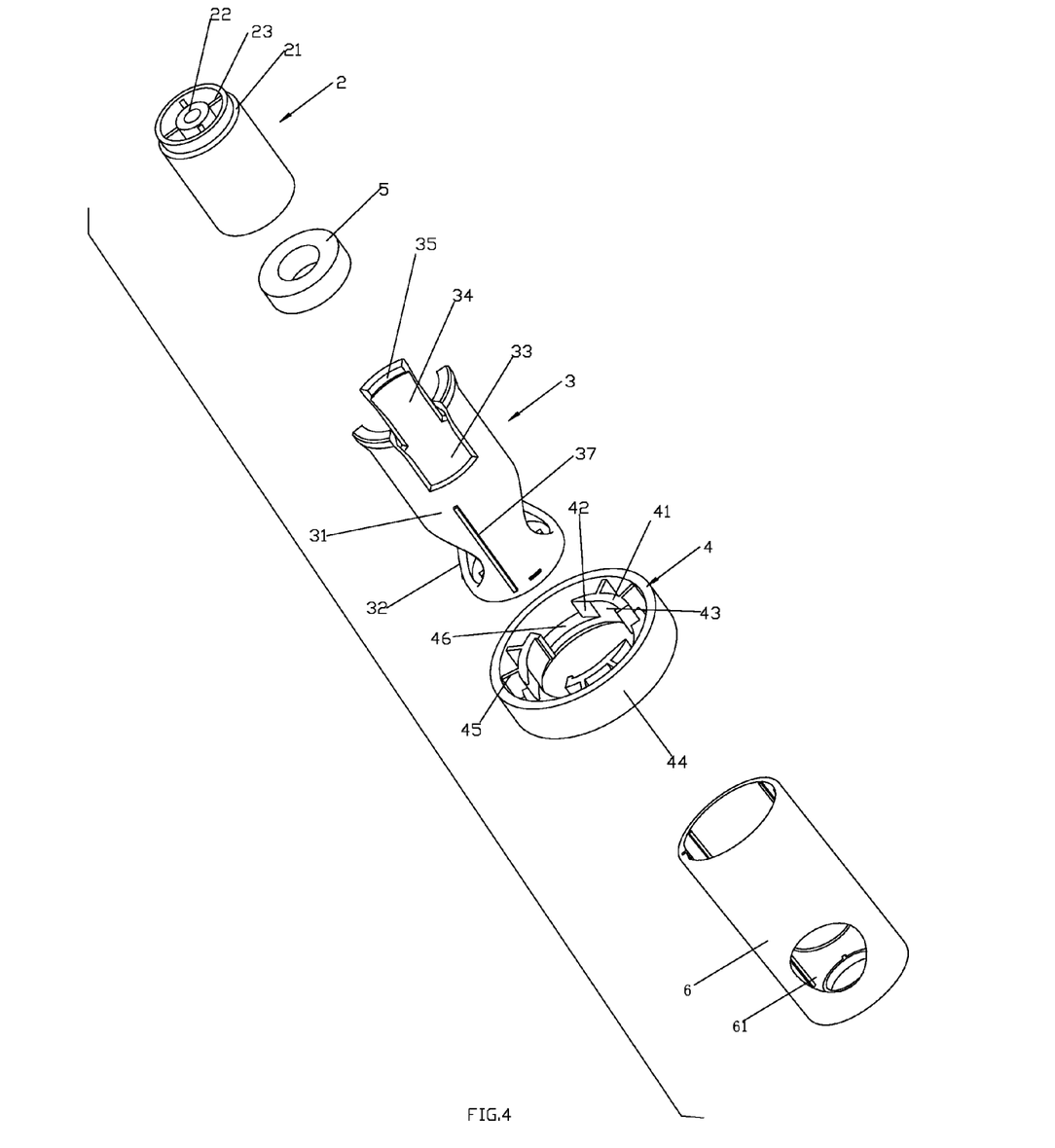
FIG. 4 illustrates an exploded and schematic diagram of the wall bracket device.
Figure 5:
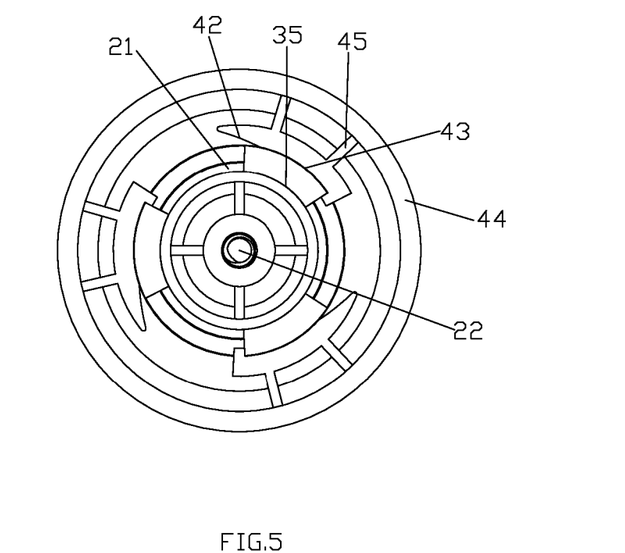
FIG. 5 illustrates a top view of the wall bracket device in locking and connecting state.
Figure 6:
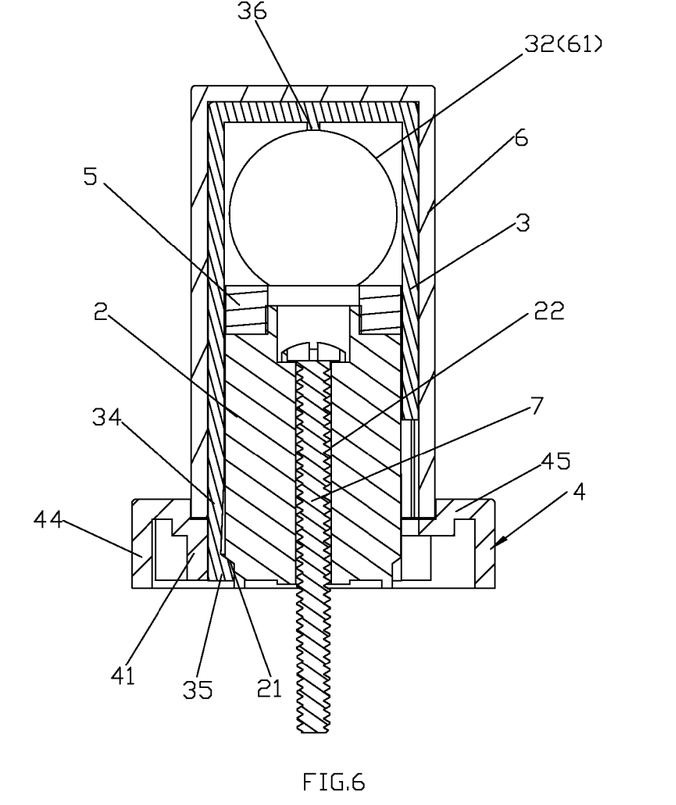
FIG. 6 illustrates a sectional diagram of the wall bracket device in locking and connecting state.
Figure 7:
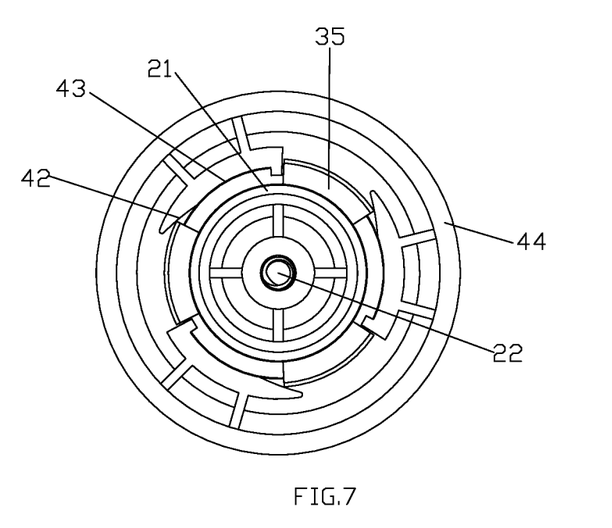
FIG. 7 illustrates a top view of the wall bracket device in releasing state.
Figure 8:
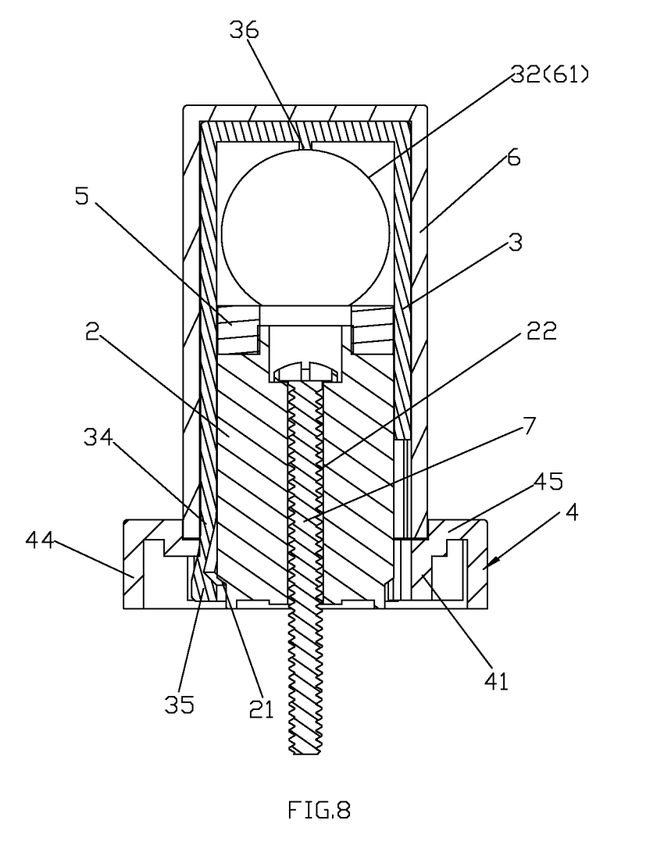
FIG. 8 illustrates a sectional diagram of the wall bracket device in releasing state.

The bar 1 is inserted to the assembly hole 32, the rotation sleeve 4 is rotatably sleeved on the sleeve portion 31, the guiding surface 42 abuts against the end of the outer wall of the suspending arm 34, therein: referring to FIG. 5 and FIG. 6, when the rotation sleeve 4 rotates forwardly, the portion of reducing diameter of the guiding surface 42 pushes the suspending arm 34, so that the suspending arm 34 deforms to make the lock catch 34 abut against the step surface 21, so that the lock set 3 slides with respect to the wall bracket 2, the wall bracket 2 abuts against the bar 1, with the lock catch 35 pushing the step surface 21 and the wall bracket 2 pushing the bar 1, the wall bracket 2, the lock set 3 and the bar 1 are locked together, that is to say, the lock set is locked to the wall bracket, the lock set is also locked to the bar; referring to FIG. 7 and FIG. 8, when the rotation sleeve 4 rotates reversely, the portion of larger diameter of the guiding surface 42 is corresponding to the suspending arm 34, the suspending arm 34 deforms and restores, the lock set and the wall bracket release the locking therebetween, the lock set and the bar release the locking therebetween.

To keep the rotation sleeve 4 in locking state, the rotation sleeve 4 is preferred positioned and locked at the outer side of the lock set 3.

In this embodiment, the coupling boss 41 is further disposed with a holding surface 43 connected to the smallest inner diameter side of the guiding surface 42, the inner side surface of the holding surface 43 is an arc surface and the diameter thereof is equal to the smallest inner diameter of the guiding surface 42. The rotation sleeve 4 is disposed with an outer sleeve 44, the coupling boss 41 is disposed in the outer sleeve 44, the upper periphery of the outer sleeve 44 is extending inwardly to form an annular plate 46, the coupling boss 41 is fixedly connected to the inner periphery of the annular plate 46, a second spoke 45 is fixedly connected between the coupling boss and the outer sleeve.

It further comprises a decoration cover 6, the decoration cover 6 is disposed with a throughout hole 61 running throughout vertically, the decoration cover 6 is sleeved on the lock set 3, the throughout hole 61 is aligned with the assembly hole 32 in coupling way. The end of the decoration cover 6 abuts against the annular plate 46, so that the rotation sleeve 4 is positioned and connected at the outer side of the lock set 3. Preferred, the annular plate 46 is a step structure with lower inner and higher outer, the end of the decoration cover 6 is disposed in the inner step surface. A aligning and limiting structure is disposed between the decoration cover and the lock set 3, for example, the decoration cover is disposed with a slide groove, the lock set is disposed with a rib 37 along the parallel axis, the rib is coupled to the slide groove and is connected to the slide groove in sliding way.

Preferred, the outer end of the sleeve portion 31 is closed, the center of circle of the close plate is disposed with a protruding 36 facing the assembly hole, the end face of the protruding 36 is an arc surface, the arc surface is coupled to the assembly hole, the protruding abuts against the bar, the friction pad abuts against the bar, so as to lock the bar. It has well and strong locking performance.

In this embodiment, it comprises three suspending arm that are arranged annularly, it also has three coupling bosses that are arranged annularly.

Figure 9:
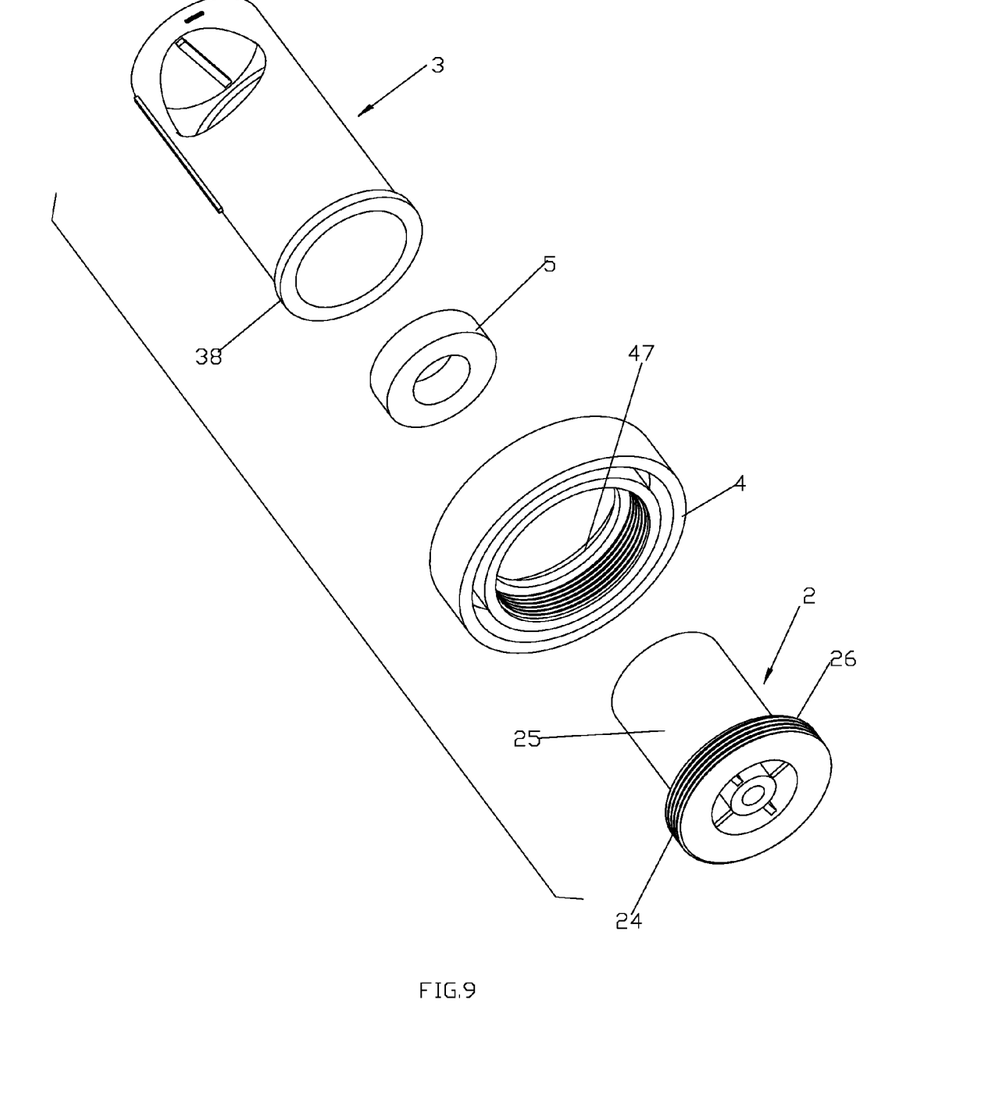
FIG. 9 illustrates an exploded and schematic diagram of the sliding bar of a second embodiment.

A second embodiment differs from the first embodiment in that: referring to FIG. 9, the wall bracket 2 comprises a step portion, the step portion is disposed with a big section 24, a small section 25 and a stage surface 26 between the big section 24 and the small section 25; the sleeve portion 31 is sleeved on the small section 25 in sliding way, the big section 24 and the rotation sleeve 4 form a detachable connection mechanism. The outer periphery of the end of the sleeve portion 31 corresponding to the wall bracket 2 is extending outwardly to form a first protruding ring 38; the inner periphery of one end of the rotation sleeve 4 extending inwardly to form a second protruding ring 47; the inner diameter of the second protruding ring 47 is coupled to the outer diameter of the sleeve portion 31, the outer diameter of the big section 24 is larger than the inner diameter of the second protruding ring 47, the big section 24 and the rotation sleeve 4 are assembled together to make the second protruding ring 47, the first protruding ring 38 and the stage surface 26 contacted tightly. The big section is disposed with external thread, the rotation sleeve 4 is disposed with internal thread, the internal thread is coupled to and threaded to the external thread.

Figure 10:
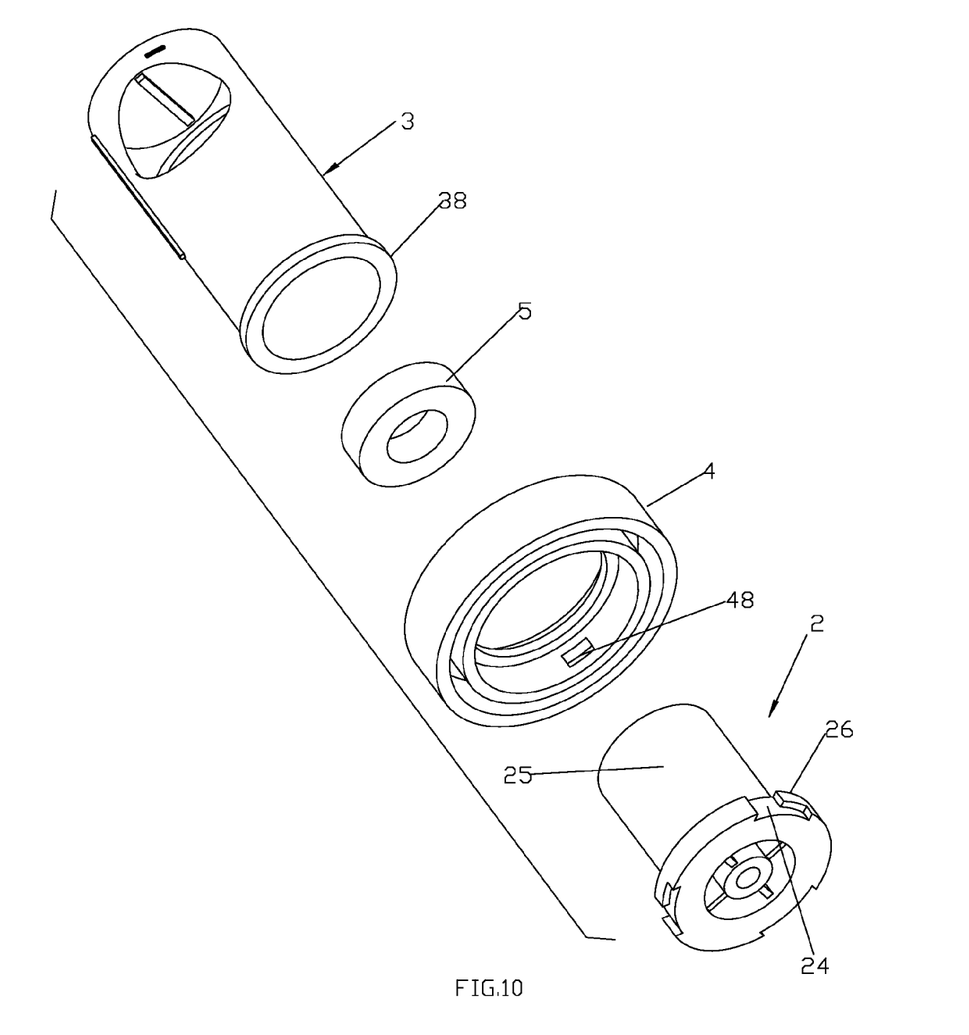
FIG. 10 illustrates an exploded and schematic diagram of the sliding bar of a third embodiment.

A third embodiment differs from the second embodiment in that: referring to FIG. 10, the periphery wall of the big section is concaved with a step groove 27, the step groove is L shaped with a longitudinal groove and a transverse groove connected to the bottom end of the longitudinal groove, the opening of the longitudinal groove is connected to the step surface; the inner wall of the rotation sleeve 4 is protruding with a protruding block 48, the protruding block is coupled to the longitudinal groove of the step groove; sliding the rotation sleeve with respect to the wall bracket can make the protruding groove coupled to and embedded to the longitudinal groove, then rotating the rotation sleeve and the wall bracket can make the protruding groove embedded to the transverse groove, so as to accomplish locking and connecting.

Figure 11:
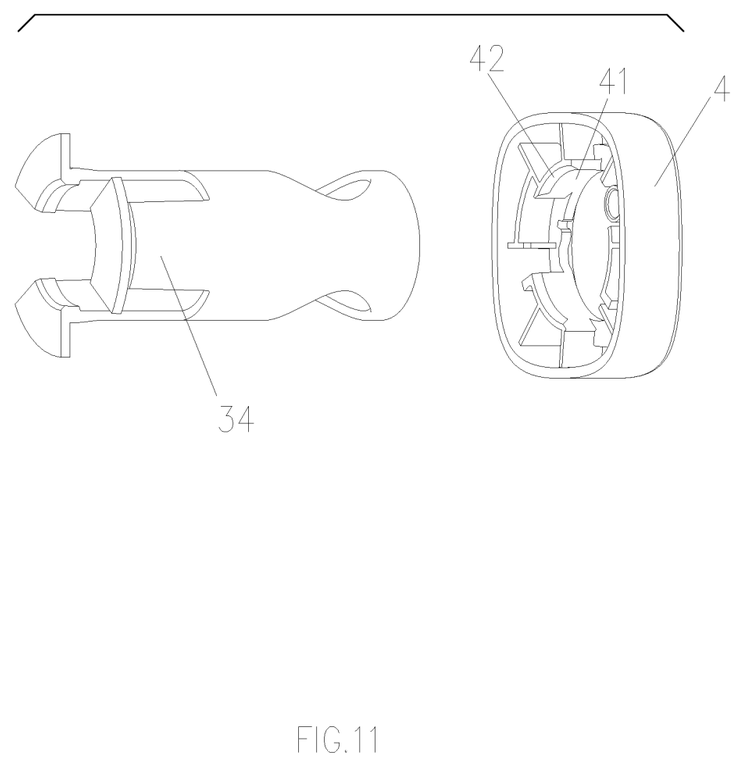
FIG. 11 illustrates an exploded and schematic diagram of the sliding bar of a fourth embodiment.

A fourth embodiment differs from the first embodiment in that: please referring to FIG. 11, the rotation sleeve 4 can be sleeved on the sleeve portion 31 and move forth and back in the axial direction of the sleeve portion 31; the coupling boss 41 is disposed with a guiding surface 42 along the moving direction of the rotation sleeve 4, the semi-diameter of the guiding surface 42 is gradually changing, the guiding surface 42 abuts against the end of the suspending arm 34, with the gradually changing semi-diameter of the guiding surface 42, the suspending arm 34 can be elastic deformed. This embodiment has a different method from the rotation locking method of the first embodiment, it applies with a method of directly plug in the axial direction of the sleeve portion 31 that can be achieve the same effect as the first embodiment.

Figure 12:
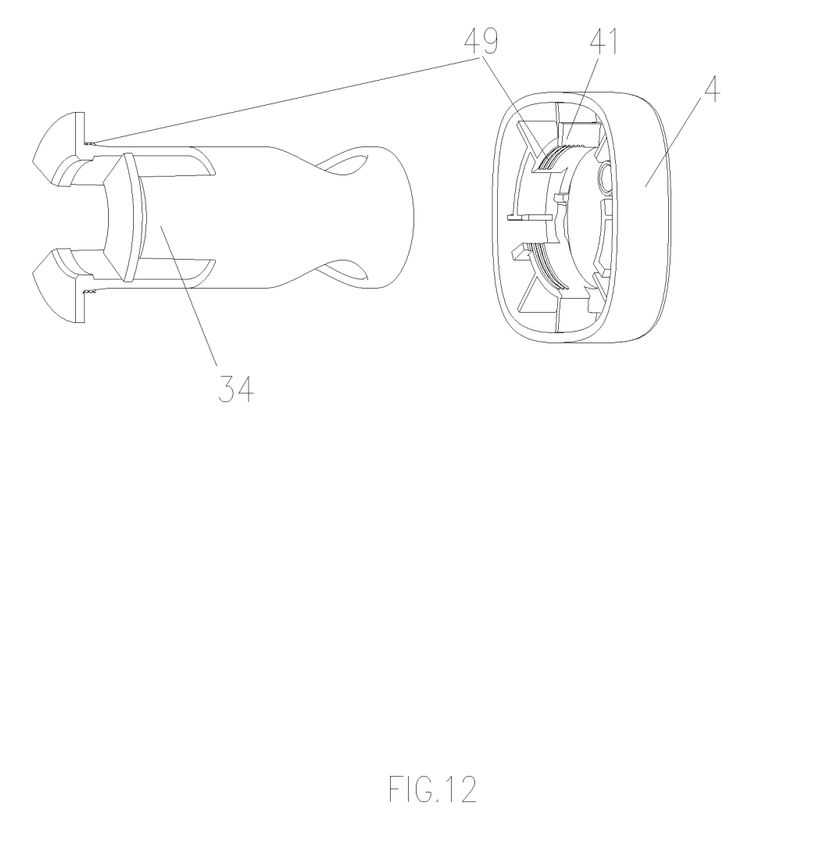
FIG. 12 illustrates an exploded and schematic diagram of the sliding bar of a fifth embodiment.

A fifth embodiment differs from the first embodiment in that: referring to FIG. 12, the coupling boss 41 and the suspending arm 34 are respectively disposed with coupling thread 49, with the biting force of the threads 49, the suspending arm (34) can be elastic deformed, so as to accomplish locking.

Figure 13:
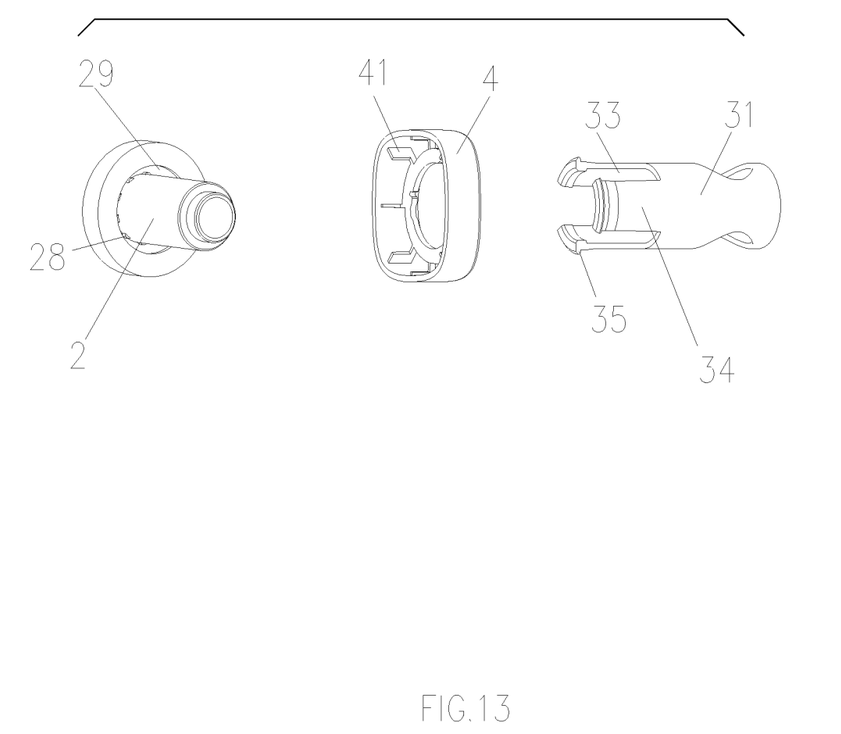
FIG. 13 illustrates an exploded and schematic diagram of the sliding bar of a sixth embodiment.

A sixth embodiment differs from the first embodiment in that: referring to FIG. 13, the wall bracket 2 is disposed with an accommodating cavity 29 surrounding the front end of the wall bracket 2 and facing the rear end of the wall bracket 2, the accommodating cavity 29 is disposed with a plurality of ribs 28; the end face of the sleeve portion 31 is concaved with at least two grooves 33, a suspending arm 34 is formed between two adjacent grooves 33, the end of the suspending arm 34 is protruding inwardly to form a lock catch 35; a coupling boss 41 is fixedly disposed in the rotation sleeve 4; the sleeve portion 31 can be sleeved on the wall bracket, so that the rib abuts against the end of the suspending arm; with the push force, the suspending arm can be elastic deformed to make the lock catch 35 abut against the coupling boss 41. In this embodiment, the suspending arm (34) has its elastic deforming not inwardly but outwardly so as to abut against the coupling boss 41 and thus locked, it has a different designation idea from the first embodiment, but having the same effect as the first embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A rotation type sliding bar with quick assembly and disassembly, comprising
a bar (1) and a wall bracket device, wherein the wall bracket device comprises a wall bracket (2) that can be fixedly assembled to the wall, a lock set (3) and a rotation sleeve (4);
the lock set (3) is disposed with a sleeve portion (31) coupled to and slidably sleeved on an outer side of the wall bracket (2), the sleeve portion (31) is disposed with at least an assembly hole (32) vertically running through the sleeve portion (31);
the bar (1) is inserted to the assembly hole (32), the rotation sleeve (4) is sleeved on the sleeve portion (31), the rotation sleeve (4) is coupled to the wall bracket (2), the wall bracket (2), the lock set (3) and the rotation sleeve (4) are locked and the sleeve portion (31) is driven to slide with respect to the wall bracket (2) by moving the rotation sleeve (4), so that the wall bracket (2) pushes the bar (1) to lock and connect the wall bracket (2), the lock set (3) and the bar (1),
wherein the wall bracket (2) is disposed with a step surface (21) surrounding an end of the wall bracket and facing the end of the wall bracket;
an end face of the sleeve portion (31) is concaved with at least two grooves (33), a suspending arm (34) is formed between two adjacent grooves (33), an end of the suspending arm (34) is protruding inwardly to form a lock catch (35);
a coupling boss (41) is fixedly disposed in the rotation sleeve (4);
the rotation sleeve (4) can be sleeved on the sleeve portion (31) and the coupling boss (41) abuts against the end of the suspending arm (34), so that the suspending arm (34) can be elastically deformed to make the lock catch (35) abut against the step surface (21) or the suspending arm (34) is elastically deformed and repositioned, the lock catch (35) pushes the step surface (21) and the wall bracket (2) pushes the bar (1) to lock and connect the wall bracket (2), the lock set (3) and the bar (1) together.

2. The rotation type lifting bar with quick assembly and disassembly according to claim 1, wherein the rotation sleeve (4) can be sleeved on the sleeve portion (31), the coupling boss (41) is disposed with a guiding surface (42) along a rotation direction of the rotation sleeve (4), a semi-diameter of the guiding surface (42) is gradually changing, the guiding surface (42) abuts against the end of the suspending arm (34), with the gradually changing semi-diameter of the guiding surface (42), the suspending arm (34) can be elastically deformed.

3. The rotation type lifting bar with quick assembly and disassembly according to claim 2, wherein the coupling boss (41) is further disposed with a holding surface (43) connected to a smallest inner diameter side of the guiding surface (42), the inner side surface of the holding surface (43) is an arc surface and the diameter thereof is equal to the smallest inner diameter of the guiding surface (42).

4. The rotation type lifting bar with quick assembly and disassembly according to claim 1, wherein
the rotation sleeve (4) can be sleeved on the sleeve portion (31) and move forth and back in an axial direction of the sleeve portion (31);
the coupling boss (41) is disposed with a guiding surface (42) along a moving direction of the rotation sleeve (4), a semi-diameter of the guiding surface (42) is gradually changing, the guiding surface (42) abuts against the end of the suspending arm (34), with the gradually changing semi-diameter of the guiding surface (42), the suspending arm (34) can be elastically deformed.

5. The rotation type lifting bar with quick assembly and disassembly according to claim 1, wherein the end of the suspending arm (34) is raised in its natural state.

6. The rotation type lifting bar with quick assembly and disassembly according to claim 1, wherein the rotation sleeve (4) is disposed with an outer sleeve (44), the coupling boss (41) is disposed in the outer sleeve (44) and is fixedly connected by a spoke (45), the upper periphery of the outer sleeve (44) is extending inwardly to form an annular plate (46), the coupling boss (41) is fixedly connected to the inner periphery of the annular plate (46).

7. The rotation type sliding bar with quick assembly and disassembly according to claim 1, wherein the rotation sleeve (4) is connected at an outer side of the lock set (3).

8. The rotation type sliding bar with quick assembly and disassembly according to claim 1, wherein the sleeve portion (31) is disposed with a friction pad (5) at the inner side, the friction pad (5) abuts against between the wall bracket (2) and the bar (1).

9. The rotation type sliding bar with quick assembly and disassembly according to claim 1, wherein further comprising a decoration cover (6), the decoration cover (6) is disposed with a throughout hole (61) running throughout vertically, the decoration cover (6) is sleeved on the lock set (3), the throughout hole (61) is aligned and coupled with the assembly hole (32).

* * * * *